United States Patent [19]

Ishikawa et al.

[11] Patent Number: 5,428,089

[45] Date of Patent: Jun. 27, 1995

[54] DIORGANOPOLYSILOXANE COMPOSITION WITH EXCELLENT HEAT RESISTANCE

[75] Inventors: Hiroki Ishikawa; Tsutomu Naganawa; Isao Ona, all of Chiba, Japan

[73] Assignee: Dow Corning Toray Silicon Co., Ltd., Tokyo, Japan

[21] Appl. No.: 271,707

[22] Filed: Jul. 7, 1994

[30] Foreign Application Priority Data

Jul. 26, 1993 [JP] Japan .................................. 5-203582

[51] Int. Cl.$^6$ ................................................ C08K 5/54
[52] U.S. Cl. ...................................... 524/188; 524/264; 524/267; 528/38; 427/387; 427/568; 427/389.9; 252/8.6; 252/8.8
[58] Field of Search ................. 252/8.8, 8.6; 427/568, 427/387, 389.9; 528/38; 524/188, 267, 264

[56] References Cited

U.S. PATENT DOCUMENTS

| | | | |
|---|---|---|---|
| 4,973,620 | 11/1990 | Ona et al. | 528/26 |
| 4,978,363 | 12/1990 | Ona et al. | 427/387 |
| 5,073,275 | 12/1991 | Ona | 252/8.6 |
| 5,334,653 | 8/1994 | Kennoki et al. | 528/38 |

FOREIGN PATENT DOCUMENTS

| | | |
|---|---|---|
| 157499 | 10/1985 | European Pat. Off. . |
| 159120 | 10/1985 | European Pat. Off. . |
| 12739 | 12/1976 | Japan . |

*Primary Examiner*—Melvyn I. Marquis
*Attorney, Agent, or Firm*—James L. DeCesare

[57] ABSTRACT

Diorganopolysiloxane compositions are provided with excellent heat resistance, especially diorganopolysiloxane compositions that are suitable for synthetic fiber lubricants. The diorganopolysiloxane composition is a mixture of (A) a diorganopolysiloxane oil and (B) an amino-group-containing diorganopolysiloxane, and has an average amino equivalent in the range of 10,000–1,000,000 and a viscosity at 25° C. in the range of 10–100,000 cs.

4 Claims, No Drawings

DIORGANOPOLYSILOXANE COMPOSITION WITH EXCELLENT HEAT RESISTANCE

BACKGROUND OF THE INVENTION

The present invention concerns diorganopolysiloxane compositions with excellent heat resistance, especially diorganopolysiloxane compositions suitable as oils for synthetic fibers.

Natural fibers such as cotton, and wool have excellent smoothness, because of the wax or lanolin adhered on their surface. However, such smoothness is lacking in synthetic fibers such as nylon fibers, polyester fibers, polypropylene fibers, and TEFLON. Thus, oils are used on raw synthetic fibers to provide smoothness and antistatic properties. The yarns prepared from such raw fibers are subjected to false twisting for various purposes such as bulk, and stretch recovery. At this time, the yarn is brought into contact with a hotplate at a temperature of 300° C. or more, and such yarns are treated with false twisting oils to impart heat resistance to them.

In the preparation of carbon fibers and graphite fibers from polyacrylonitrile synthetic fibers, the precursor obtained by spinning is heated at 300°–400° C. to obtain flame-resistant fibers, and an oil is used to prevent the filaments from sticking together.

Compared with raw fibers for apparel, the raw fibers for industrial tire cords are brought into contact with hot rolls for a long time and heat-set at 300°–350° C. Thus, such raw fibers are treated for enhanced heat resistance with lubricants for raw fibers for tire cords.

Mineral oils and animal and vegetable oils are used in such lubricants for raw fibers and false-twist yarns. As lubricants for the raw fibers for carbon fibers, e.g., dimethylsilicone oil (see Japanese Kokoku Patent No. Sho 51[1976]-12739) and amino-group-containing silicone oils (see Japanese Kokai Patent Application Nos. Sho 60[1985]-185879, Sho 60[1985]-185880) have been proposed.

However, the mineral oils and vegetable oils have low heat resistance, and they tend to decompose at low temperatures, causing problems in bringing out their functions under high temperature. The silicone oils described above do not have sufficient heat resistance; thus, when exposed to high temperature for a long period of time, they become a tacky gel, which accumulates, causing reduced heat treatment efficiency and reduced fiber running, fiber disturbances and breakage. Thus, improvements are desired in synthetic fiber lubricants used for raw fibers, false-twist fibers, raw fibers for carbon fibers, and raw fibers for tire cords.

SUMMARY OF THE INVENTION

As a result of an intense study for solving such problems, we have discovered that such problems can be solved by mixing diorganopolysiloxanes oils and amino-group-containing diorganopolysiloxanes to obtain an average amino equivalent within a certain range. Thus, the present invention is attained.

It is an object of the present invention to provide diorganopolysiloxane compositions with excellent heat resistance, especially to provide diorganopolysiloxane compositions suitable for use as synthetic fiber lubricants.

DETAILED DESCRIPTION OF THE INVENTION

The present invention concerns a diorganopolysiloxane composition with excellent heat resistance, comprising a mixture of (A) a diorganopolysiloxane fluid and (B) an amino-group-containing diorganopolysiloxane, with an average amino equivalent of 10,000–1,000,000 and a viscosity of 10–100,000 cs at 25° C.

The diorganopolysiloxane oils used as the component (A) in the present invention can be represented by the formula,

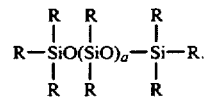

In the formula, R is a substituted or unsubstituted monovalent hydrocarbon group, more specifically an alkyl group such as a methyl group, ethyl group, propyl group, hexyl group, or octyl group; an alkenyl group such as a vinyl group, allyl group, or hexenyl group, an aryl group such as a phenyl group, an arylalkyl group such as,

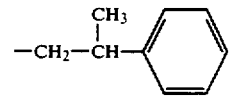

a substituted hydrocarbon group such as a 3,3,3-trifluoropropyl group; but a methyl group is preferred. The value of "a" is a selected to provide a viscosity of 10 cs or more at 25° C. to the component. Such diorganopolysiloxane oils include dimethylpolysiloxane oils, dimethylsiloxane-methylethylsiloxane copolymer oils, dimethylsiloxane-methylvinylsiloxane copolymer oils, dimethylsiloxane-methylphenylsiloxane copolymer oils, dimethylsiloxane-diphenylsiloxane copolymer oils, dimethylsiloxane-methyldodecenylsiloxane copolymer oils, methyldodecenylsiloxane-methyltetradecenylsiloxane copolymer oils, and a diorganopolysiloxane oil represented by the formula,

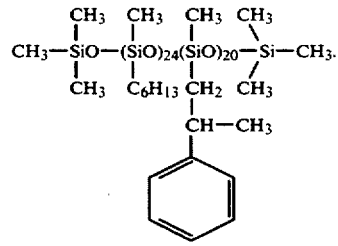

Among them, a dimethylpolysiloxane oil is preferred.

The amino-group-containing diorganopolysiloxanes used for component (B) of the present invention enhance the heat resistance of the compositions of the present invention, preventing thermal thickening or gelation. This component contains at least one amino group in the molecule, and the amino group can be represented by the formula,

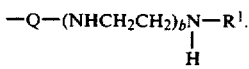

In the formula, $R^1$ represents hydrogen atom, or identical or different monovalent $C_1$-$C_{20}$ hydrocarbon groups, such as methyl groups, ethyl groups, propyl groups, phenyl groups, and cyclohexyl groups. Q represents a divalent hydrocarbon group which is an alkylene group such as a methylene group, ethylene group, propylene group, or the group

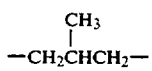

; an alkylenearylene group such as —(CH$_2$)$_2$C$_6$H$_4$—; but a propylene group is most preferred. "b" is an integer with a value of 0–10; and 0 or 1 is most preferred. Usually, the amino group in the above formula is bonded to the main chain, although it may be bonded to either the main chain or the terminus or both. This component has an amino equivalent of 1,000–100,000; the especially preferred range is 2,000–50,000. The viscosity at 25° C. of this component is preferably 10–100,000 cs. With a viscosity below 10 cs, the heat resistance of the compositions of the present invention tends to decrease, whereas above 100,000 cs, the fluidity of this component tends to decrease.

Such amino-group-containing diorganopolysiloxanes can be represented by the general formula

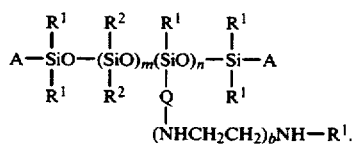

In the formula, A represents a monovalent hydrocarbon group similar to $R^1$ or an amino group of the formula

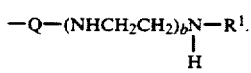

Here, $R^1$, Q and b are as described above, and $R^2$ is a monovalent hydrocarbon group similar to the above $R^1$. For uniform dissolution of this component in the component (A), when the component (A) is a dimethylpolysiloxane, $R^2$ is preferably a methyl group. When component (A) is a dimethylsiloxane-methylphenylsiloxane copolymer oil or a dimethylsiloxane-diphenylsiloxane copolymer oil, $R^2$ is preferably a methyl group and a phenyl group or two phenyl groups. When component (A) is a dimethylsiloxane-methyldodecenylsiloxane copolymer oil, $R^2$ is preferably $C_{10}$-$C_{12}$ alkyl groups. m and n are integers with values of 1 or more, and m+n is a number chosen to provide this component with a viscosity of 10–100,000 cs at 25° C.

This component can be prepared by reacting diorganopolysiloxanes terminated by reactive groups such as SiH, or SiCH$_2$CH$_2$CH$_2$Cl, with amino compounds such as CH$_2$=C ( CH$_3$ ) CH$_2$NHCH$_2$NH$_2$, or H$_2$NCH$_2$CH$_2$NH$_2$. (see Japanese Kokai Patent Application No. Sho 53[1978]-98499).

The compositions of the present invention are mixtures comprising components (A) and (B), with an average amino equivalent in the range of 10,000–1,000,000 and a viscosity of 10–100,000 cs at 25° C., preferably an average amino equivalent in the range of 50,000–200,000 and viscosity 10–50,000. With the amino equivalent below 10,000, crosslinking between the molecules increases at high temperature with easy gelation, whereas above 1,000,000, the heat resistance effects of the amino groups disappears. For example, when 10 parts by weight of an amino-group-containing diorganopolysiloxane oil with an amino equivalent of 2,000 as component (B) are mixed with 90 parts by weight of a diorganopolysiloxane oil as component (A), the resulting composition of the present invention would have an amino equivalent of 20,000. When 10 parts by weight of an amino-group-containing diorganopolysiloxane (amino equivalent of 2,000) are mixed with 990 parts by weight of component (A), the composition of the present invention obtained would have an average amino equivalent of 200,000.

The compositions of the present invention, which are mixtures of components (A) and (B), may also contain inorganic powders such as mica, talc, zinc oxide, and calcium carbonate; organic materials such as paraffin waxes; organic solvents such as toluene, xylene, hexane, heptane, 1,1,1-trichloroethane, and 1,1,2,2-tetrachloroethane; nonionic surfactants such as polyoxyalkylene alkyl ethers, polyoxyalkylene alkylphenyl ethers, polyoxyalkylene alkyl esters, polyoxyalkylene sorbitan alkyl esters, sorbitan alkyl esters, polyethylene glycol, and polypropylene glycol; cationic surfactants such as octyltrimethylammonium hydroxide, dodecyltrimethylammonium hydroxide, hexadecyltrimethylammonium hydroxide, octyldimethylbenzylammonium hydroxide, decyldimethylammonium hydroxide, didodecyldimethylammonium hydroxide, dioctadecyldimethylammonium hydroxide, tallow trimethylammonium hydroxide, and coconut oil trimethylammonium hydroxide; all of which are within the scope of the present invention.

The compositions of the present invention may be obtained by mixing desired amounts of components (A) and (B) with uniform mutual dissolution.

As described above, the compositions of the present invention comprise components (A) and (B), with an average amino equivalent in the range of 10,000–1,000,000, for excellent heat resistance. Such compositions of the present invention are suitable for synthetic fiber lubricants for raw fibers, false-twist fibers, carbon fiber precursor fibers, and tire cord fibers. For such excellent heat resistance, the compositions of the present invention may also be used as a thermal media.

When the compositions of the present invention are used as synthetic fiber lubricants, they may be used straight or after being thinned with organic solvents or after being emulsified in water with surfactants. When they are used straight, they are adhered evenly on the fiber by using rollers. Here, "fiber" means continuous filament yarns, spun yarn, and tows. When the compositions of the present invention are emulsified, usually, 5–30 parts by weight of surfactants are used to 100 parts by weight of the sum of components (A) and (B). The amount of water used is usually sufficient to produce a concentration of components (A)+(B) of 5–60 wt % but 10–50 wt % is more desirable. Such emulsions are usually applied to fibers by kiss rolls or by continuously passing the fiber through the emulsions. In such cases, the emulsions may be further diluted with water. The amount of the compositions of the present invention adhered to the fiber is preferably 0.2–2.0 wt %.

The present invention is explained with the following examples. In the examples, "parts" are parts by weight, and the viscosity is the value measured at 25° C. In the examples, the change in the viscosity of the diorganopolysiloxane compositions was measured by the method given below.

Change in viscosity

In a 100-cc beaker was placed 30 g of the diorganopolysiloxane composition, then the beaker was covered with a 300-cc beaker and heat-treated in a convection oven at 200° C. for a desired period of time (50 h, 100 h, 200 h, 300 h), cooled and measured to determine the viscosity using an E-type rotatory viscometer at 25° C.

APPLICATION EXAMPLE 1

A diorganopolysiloxane composition with an amino equivalent of 10,000 and a viscosity of 301 cs was prepared by compounding 10 parts of dimethylpolysiloxane oil terminated by trimethylsiloxy groups at both ends with a viscosity of 301 cs and 10 parts of an amino-group-containing diorganopolysiloxane of the formula

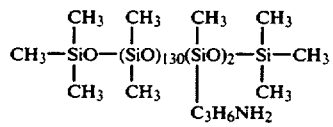

with an amino equivalent of 5,000 and a viscosity of 302 cs. The diorganopolysiloxane composition was measured to determine the change in viscosity, and the results are given in Table I.

In 99.7 parts of toluene was dissolved 0.3 part of the diorganopolysiloxane composition, and this toluene solution was applied to the raw fiber for polyester tire cord used for automobile seat belts in such a way that the treated fiber contained 0.3 wt % of the diorganopolysiloxane composition. Then, the fiber was allowed to stand at room temperature to allow the toluene to evaporate, and the resulting fiber was measured to determine its coefficient of static friction and coefficient of dynamic friction between fibers. The results are given in Table I. The results show that the diorganopolysiloxane composition is extremely suitable as a lubricant for polyester tire cords used for automobile seat belts.

APPLICATION EXAMPLE 2

A diorganopolysiloxane composition with an amino equivalent of 50,000 and a viscosity of 302 cs was prepared by compounding 90 parts of dimethylpolysiloxane oil terminated by trimethylsiloxy groups at both ends with a viscosity of 301 cs and 10 parts of an amino-group-containing diorganopolysiloxane of the formula

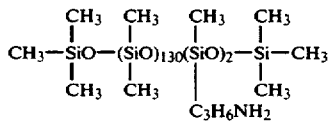

with an amino equivalent of 5,000 and a viscosity of 302 cs. The diorganopolysiloxane composition was measured to determine the change in viscosity, and the results are given in Table I.

In 99.7 parts of toluene was dissolved 0.3 part of the diorganopolysiloxane composition, and this toluene solution was applied to the raw fiber for polyester tire cord used for automobile seat belts in such a way that the treated fiber contained 0.3 wt % of the diorganopolysiloxane composition. Then, the fiber was allowed to stand at room temperature to allow the toluene to evaporate, and the resulting fiber was measured to determine its coefficient of static friction and its coefficient of dynamic friction between fibers. The results are given in Table I. The results show that the diorganopolysiloxane composition is extremely suitable as a lubricant for polyester tire cords used for automobile seat belts.

APPLICATION EXAMPLE 3

A diorganopolysiloxane composition with an amino equivalent of 100,000 and a viscosity of 302 cs was prepared by compounding 190 parts of dimethylpolysiloxane oil terminated by trimethylsiloxy groups at both ends with a viscosity of 301 cs and 10 parts of an amino-group-containing diorganopolysiloxane of the formula

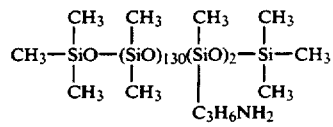

with an amino equivalent of 5,000 and a viscosity of 302 cs. The diorganopolysiloxane composition was measured to determine the change in viscosity, and the results are given in Table I.

In 99.7 parts of toluene was dissolved 0.3 part of the diorganopolysiloxane composition, and this toluene solution was applied to the raw fiber for polyester tire cord used for automobile seat belts in such a way that the treated fiber contained 0.3 wt % of the diorganopolysiloxane composition. Then, the fiber was allowed to stand at room temperature to allow the toluene to evaporate, and the resulting fiber was measured to determine its coefficient of static friction and coefficient of dynamic friction between fibers. The results are given in Table I. The results show that the diorganopolysiloxane composition is extremely suitable as a lubricant for polyester tire cords used for automobile seat belts.

The diorganopolysiloxane composition (1 drop) was dropped on a hotplate used as a wooly nylon false twister, then the hotplate was heat-treated at 300° C. for 30 h. Even after 30 h, the drop of diorganopolysiloxane composition showed no gelation at all, retained its oily state and remained evenly spread on the hotplate. This result indicates that the diorganopolysiloxane composition is extremely suitable as a lubricant for the false twisting process.

APPLICATION EXAMPLE 4

A diorganopolysiloxane composition with an amino equivalent of 500,000 and a viscosity of 302 cs was prepared by compounding 990 parts of dimethylpolysiloxane oil terminated by trimethylsiloxy groups at both ends with a viscosity of 301 cs and 10 parts of an amino-group-containing diorganopolysiloxane of the formula,

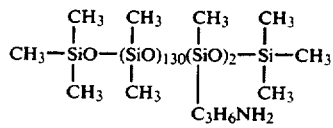

with an amino equivalent of 5,000 and a viscosity of 302 cs. The diorganopolysiloxane composition was measured to determine the change in viscosity, and the results are given in Table I.

In 99.7 parts of toluene was dissolved 0.3 part of the diorganopolysiloxane composition, and this toluene solution was applied to the raw fiber for polyester tire cord used for automobile seat belts in such a way that the treated fiber contained 0.3 wt % of the diorganopolysiloxane composition. Then, the fiber was allowed to stand at room temperature to allow the toluene to evaporate, and the resulting fiber was measured to determine its coefficient of static friction and coefficient of dynamic friction between fibers. The results are given in Table I. The results show that the diorganopolysiloxane composition is extremely suitable as a lubricant for polyester tire cords used for automobile seat belts.

APPLICATION EXAMPLE 5

A diorganopolysiloxane composition with an amino equivalent of 1,000,000 and a viscosity of 302 cs was prepared by compounding 1990 parts of dimethylpolysiloxane oil terminated by trimethylsiloxy groups at both ends with a viscosity of 301 cs and 10 parts of an amino-group-containing diorganopolysiloxane of the formula

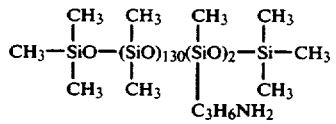

with an amino equivalent of 5,000 and a viscosity of 302 cs. The diorganopolysiloxane composition was measured to determine the change in viscosity, and the results are given in Table I.

In 99.7 parts of toluene was dissolved 0.3 part of the diorganopolysiloxane composition, and this toluene solution was applied to the raw fiber for polyester tire cord used for automobile seat belts in such a way that the treated fiber contained 0.3 wt % of the diorganopolysiloxane composition. Then, the fiber was allowed to stand at room temperature to allow the toluene to evaporate, and the resulting fiber was measured to determine its coefficient of static friction and coefficient of dynamic friction between fibers. The results are given in Table I. The results show that the diorganopolysiloxane composition is extremely suitable as a lubricant for polyester tire cords used for automobile seat belts.

Comparative Example 1

The change in viscosity was measured for 10 parts of dimethylpolysiloxane oil terminated by trimethylsiloxy groups at both ends with a viscosity of 301 cs. The results are given in Table I.

In 99.7 parts of toluene was dissolved 0.3 part of the dimethylpolysiloxane oil, and this toluene solution was applied to the raw fiber for polyester tire cord used for automobile seat belts in such a way that the treated fiber contained 0.3 wt % of the dimethylpolysiloxane oil. Then, the fiber was allowed to stand at room temperature to allow the toluene to evaporate, and the resulting fiber (x) was measured to determine its coefficient of static friction and coefficient of dynamic friction between fibers. The results are given in Table I. The results show that the dimethylpolysiloxane oil is not suitable as a lubricant for polyester tire cords used for seat belts.

Separately, in a 4-bladed, 2-stage propeller-type stirrer were mixed 50 parts of dimethylpolysiloxane oil, 5 parts of polyoxyethylene (6 mol) nonyl phenyl ether, 10 parts of polyoxyethylene (8 mol) lauryl ether, and 35 parts of water. This mixture was then emulsified in a colloid mill-type emulsifier to obtain an emulsion. This emulsion was applied to the raw fiber for nylon tire cord used for automobile seat belts in such a way that the treated fiber contained 0.3 wt % of the dimethylpolysiloxane oil. Then, the fiber was dried at room temperature, and the resulting fiber (y) was measured to determine its coefficient of static friction and coefficient of dynamic friction between fibers. The results are given in Table I. The results show that the dimethylpolysiloxane oil is not suitable as a lubricant for nylon tire cords used for seat belts.

The dimethylpolysiloxane oil (1 drop) was dropped on a hotplate used as a wooly nylon false twister, then the hotplate was heat-treated at 300° C. for 30 min. After 30 h, the dimethylpolysiloxane drop showed complete gelation, forming a tacky gel. This result indicates that the dimethylpolysiloxane oil is not suitable as a lubricant for the false twisting process.

Comparison Example 2

The change in viscosity was measured for 10 parts of an amino-group-containing diorganopolysiloxane of the formula

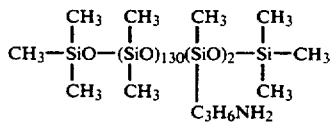

with an amino equivalent of 5,000 and a viscosity of 302 cs. The results are given in Table I.

In 99.7 parts of toluene was dissolved 0.3 part of the amino-group-containing diorganopolysiloxane, and this toluene solution was applied to the raw fiber for polyester tire cord used for automobile seat belts in such a way that the treated fiber contained 0.3 wt % of the dimethylpolysiloxane oil. Then, the fiber was allowed to stand at room temperature to allow the toluene to evaporate, and the resulting fiber was measured to determine its coefficient of static friction and coefficient of dynamic friction between fibers. The results are given in Table I. The results show that the dimethylpolysiloxane oil is not suitable as a lubricant for polyester tire cords used for seat belts.

Comparative Example 3

A diorganopolysiloxane composition with an amino equivalent of 20,000,000 and a viscosity of 302 cs was prepared by compounding 3,990 parts of dimethylpolysiloxane oil terminated by trimethylsiloxy groups at both ends with a viscosity of 301 cs and 10 parts of an amino-group-containing diorganopolysiloxane of the formula

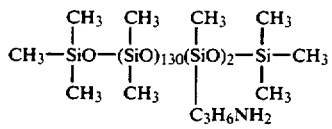

with an amino equivalent of 5,000 and a viscosity of 302 cs. The diorganopolysiloxane composition was measured to determine the change in viscosity, and the results are given in Table I.

In 99.7 parts of toluene was dissolved 0.3 part of the diorganopolysiloxane composition, and this toluene solution was applied to the raw fiber for polyester tire cord used for automobile seat belts in such a way that the treated fiber contained 0.3 wt % of the diorganopolysiloxane composition. Then, the fiber was allowed to stand at room temperature to allow the toluene to evaporate, and the resulting fiber was measured to determine its coefficient of static friction and coefficient of dynamic friction between fibers. The results are given in Table I. The results show that the diorganopolysiloxane composition is not suitable as a lubricant for polyester tire cords used for seat belts.

APPLICATION EXAMPLE 6

A diorganopolysiloxane composition with an amino equivalent of 97,020 and a viscosity of 990 cs was prepared by compounding 480 parts of a dimethylpolysiloxane oil terminated by trimethylsiloxy groups at both ends with a viscosity of 301 cs and 10 parts of an amino-group-containing diorganopolysiloxane of the formula,

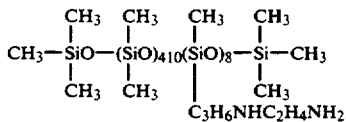

with an amino equivalent of 1,980 and a viscosity of 1100 cs. The diorganopolysiloxane composition was measured to determine the change in viscosity, and the results are given in Table I.

In a 4-bladed, 2-stage propeller-type stirrer were mixed 50 parts of diorganopolysiloxane composition, 5 parts of polyoxyethylene (6 mol) nonyl phenyl ether, 10 parts of polyoxyethylene (8 mol) lauryl ether and 35 parts of water. This mixture was then emulsified in a colloid mill-type emulsifier to obtain an emulsion. This emulsion was applied to the raw fiber for nylon tire cord used for automobile seat belts in such a way that the treated fiber contained 0.3 wt % of the diorganopolysiloxane composition. Then, the fiber was dried at room temperature, and the resulting fiber was measured to determine its coefficient of static friction and coefficient of dynamic friction between fibers. The results are given in Table I. The results show that the diorganopolysiloxane oil is extremely suitable as a lubricant for nylon tire cords used for seat belts.

Comparative Example 4

The change in viscosity was measured for 10 parts of an amino-group-containing diorganopolysiloxane of the formula

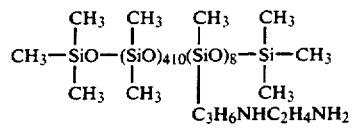

with an amino equivalent of 1,980 and a viscosity of 1100 cs. The results are given in Table I.

In a 4-bladed, 2-stage propeller-type stirrer were mixed 50 parts of diorganopolysiloxane, 5 parts of polyoxyethylene (6 mol) nonyl phenyl ether, 10 parts of polyoxyethylene (8 mol) lauryl ether, and 35 parts of water. This mixture was then emulsified in a colloid mill-type emulsifier to obtain an emulsion. This emulsion was applied to the raw fiber for nylon tire cord used for automobile seat belts in such a way that the treated fiber contained 0.3 wt % of the diorganopolysiloxane composition. Then, the fiber was dried at room temperature, and the resulting fiber was measured to determine its coefficient of static friction and coefficient of dynamic friction between fibers. The results are given in Table I. The results show that the diorganopolysiloxane oil is not suitable as a lubricant for nylon tire cords used for seat belts.

APPLICATION EXAMPLE 7

A diorganopolysiloxane composition with an amino equivalent of 100,000 was prepared by compounding 190 parts of dimethylsiloxane-methylphenylsiloxane copolymer oil of the formula

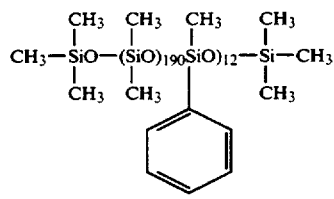

with an viscosity of 500 cs and 10 parts of an amino-group-containing diorganopolysiloxane of the formula

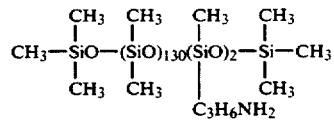

with an amino equivalent of 5,000 and a viscosity of 302. In a 50-cc beaker were placed 5 g of the diorganopolysiloxane composition obtained, and the beaker was placed in a convection oven at 300° C. for 75 h, showing good retention of the flowability of the diorganopolysiloxane composition even after 75 h.

In 98 parts of toluene were dissolved 2 parts of the diorganopolysiloxane composition, then a polyacrylonitrile tow was immersed in the toluene solution and roll-squeezed to obtain 2 wt % adhered diorganopolysiloxane composition. The tow was dried at room temperature and made into a bundle of 150 filaments that were 30 cm long. Both ends of this bundle were fixed under a 300-g load, and the bundle was made nonflammable by heating in a convection oven at 280° C. for 10 h. Then, the bundle was cooled and examined, showing no adhesion between filaments, and each filament could be separated.

Comparative Example 5

In a 50-cc beaker was placed 5 g of dimethylsiloxane-methylphenylsiloxane copolymer oil of the formula

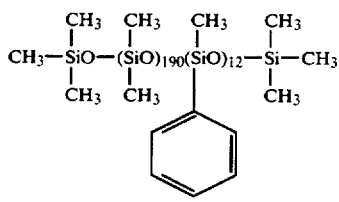

with a viscosity of 500 cs, and the beaker was placed in a convection oven at 300° C. to determine the gel time. This dimethylsiloxane-methylphenylsiloxane copolymer oil lost its flowability by gelation after 75 h.

APPLICATION EXAMPLE 8

A diorganopolysiloxane composition with an amino equivalent of 100,000 was prepared by compounding 10 parts of an amino-group-containing diorganopolysiloxane of the formula

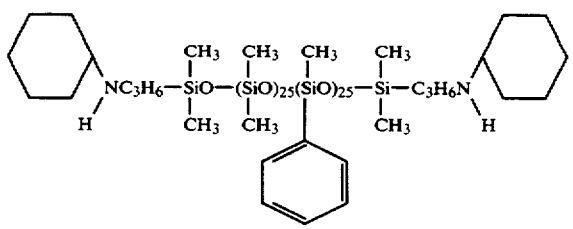

with an amino equivalent of 2,940 and a viscosity of 350 cs and a diorganopolysiloxane of the formula

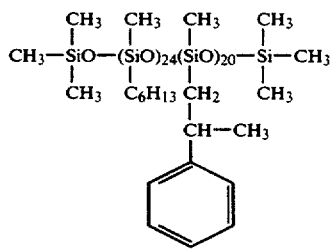

with a viscosity of 1,525 cs to produce an amino equivalent of 100,000. In a 50-cc beaker was placed 5 g of the diorganopolysiloxane composition, and the beaker was placed in a hot-air drier at 150° C. for 30 h. Even after 30 h, the diorganopolysiloxane composition retained its flowability without gelation.

The diorganopolysiloxane composition was roll-adhered in the amount of 4 wt % to a spun polyester sewing machine thread, and the sewability of this thread was measured using an industrial sewing machine. It showed no breakage or skipped stitches.

TABLE I

| | Change in Viscosity (cs) Heat Treatment | | | | Coefficient of Static Friction | Coefficient of Dynamic Friction |
|---|---|---|---|---|---|---|
| | 50 Hr | 100 Hr | 200 Hr | 300 Hr | | |
| Application Example | | | | | | |
| 1 | 647 | 951 | 1702 | 3665 | 0.185 | 0.122 |
| 2 | 250 | 256 | 266 | 278 | 0.177 | 0.121 |
| 3 | 231 | 234 | 231 | 245 | 0.183 | 0.118 |
| 4 | 320 | 381 | 1400 | 4300 | 0.176 | 0.123 |
| 5 | 315 | 381 | 1800 | 6500 | 0.188 | 0.125 |
| 6 | 975 | 1025 | 1030 | 1030 | 0.201 | 0.140 |
| Comparative Example | | | | | | |
| 1 | 331 | 356 | 5003 | Gelation | (x) 0.192 (y) 0.241 | (x) 0.131 (y) 0.163 |
| 2 | 2300 | Gelation | — | — | 0.170 | 0.110 |
| 3 | 310 | 315 | 890 | Gelation | 0.195 | 0.128 |
| 4 | 2355 | 3995 | Gelation | — | 0.222 | 0.148 |

The compositions of the present invention are mixtures comprising the components (A) and (B) with an average amino equivalent in the range of 10,000–1,000,000 and are characterized by having excellent heat resistance. Such compositions of the present invention are suitable for synthetic fiber lubricants, especially for raw fibers, false-twist fibers, precursor fibers for carbon fibers, and raw fibers for tire cords.

Other variations and modifications may be made in the compounds, compositions, and methods described herein, without departing from the essential features and concepts of the present invention.

The forms of the invention described herein are exemplary only, and are not intended as limitations on the scope of the invention as defined in the appended claims.

That which is claimed is:

1. A diorganopolysiloxane composition with excellent heat resistance comprising a mixture of (A) a diorganopolysiloxane fluid having the formula

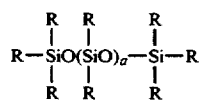

in which a has a value providing a viscosity of 10 centistokes or more at 25° C.; and R is a monovalent hydrocarbon group selected from the group consisting of alkyl, alkenyl, aryl, and arylalkyl; and (B) an amino-group-containing diorganopolysiloxane having the formula

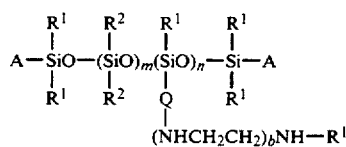

which m and n have a value of 1 or more and m+n provides a viscosity of 10-100,000 centistokes at 25° C.; $R^1$ is hydrogen, methyl, ethyl, propyl, or phenyl; Q is an alkylene group or an alkylenearylene group; b has a value of 0-10; $R^2$ is a monovalent $C_{1-20}$ hydrocarbon group; and A is a monovalent $C_{1-20}$ hydrocarbon group or amino group $-Q-(NHCH_2CH_2)_bNH-R^1$.

2. A method of treating synthetic fibers with a lubricant in order to impart heat resistance to the fibers comprising applying to the synthetic fibers a mixture according to claim 1.

3. A diorganopolysiloxane composition with excellent heat resistance comprising a mixture of (A) a diorganopolysiloxane fluid having the formula

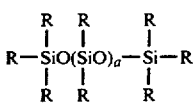

in which a has a value providing a viscosity of 10 centistokes or more at 25° C.; and R is a monovalent hydrocarbon group selected from the group consisting of alkyl, alkenyl, aryl, and arylalkyl; and (B) an amino-group-containing diorganopolysiloxane having the formula

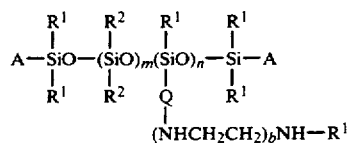

in which m and n have a value of 1 or more and m+n provides a viscosity of 10-100,000 centistokes at 25° C.; $R^1$ is hydrogen or a monovalent $C_{1-20}$ hydrocarbon group; Q is an alkylene group or an alkylenearylene group; b has a value of 0-10; $R^2$ is a monovalent $C_{1-20}$ hydrocarbon group; and A is an amino group $-Q-(NHCH_2CH_2)_bNH-R^1$.

4. A method of treating synthetic fibers with a lubricant in order to impart heat resistance to the fibers comprising applying to the synthetic fibers a mixture according to claim 3.

* * * * *